(12) United States Patent
Lu et al.

(10) Patent No.: US 8,245,539 B2
(45) Date of Patent: Aug. 21, 2012

(54) METHODS OF PRODUCING GLASS SHEETS

(75) Inventors: Hung Cheng Lu, Ithaca, NY (US);
Dean G. Sakona, Bellefonte, PA (US);
Naiyue Zhou, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/779,266

(22) Filed: May 13, 2010

(65) Prior Publication Data

US 2011/0277507 A1    Nov. 17, 2011

(51) Int. Cl.
*C03B 17/06* (2006.01)
*C03B 33/02* (2006.01)

(52) U.S. Cl. ................ 65/97; 65/112; 65/166; 65/176

(58) Field of Classification Search ............ 65/97, 112, 65/166, 176
See application file for complete search history.

(56) References Cited

U.S. PATENT DOCUMENTS

| | | | |
|---|---|---|---|
| 4,511,387 A * | 4/1985 | Kellar et al. | 65/287 |
| 5,165,585 A | 11/1992 | Lisec | 225/2 |
| 5,873,922 A | 2/1999 | Lisec | 65/112 |
| 6,616,025 B1 | 9/2003 | Andrewlavage, Jr. | 225/96.5 |
| 6,774,978 B2 | 8/2004 | Shin | 349/187 |
| 7,204,400 B2 | 4/2007 | Marek et al. | 225/1 |
| 2004/0211218 A1 * | 10/2004 | Jotaki | 65/105 |
| 2005/0103055 A1 * | 5/2005 | Gfeller et al. | 65/112 |
| 2006/0042314 A1 | 3/2006 | Abbott, III et al. | 65/25.3 |
| 2006/0249553 A1 | 11/2006 | Ukrainczyk | 225/2 |
| 2006/0261118 A1 | 11/2006 | Cox et al. | 225/96 |
| 2007/0039990 A1 | 2/2007 | Kemmerer et al. | 225/2 |
| 2007/0095108 A1 | 5/2007 | Kirby et al. | 65/475 |
| 2008/0131651 A1 * | 6/2008 | Burdette et al. | 428/98 |
| 2008/0264994 A1 * | 10/2008 | Herve et al. | 225/2 |
| 2008/0276646 A1 * | 11/2008 | Chalk et al. | 65/17.2 |
| 2008/0276785 A1 * | 11/2008 | Dahroug et al. | 83/886 |
| 2009/0250497 A1 | 10/2009 | Cox et al. | 225/2 |
| 2011/0094267 A1 | 4/2011 | Aniolek et al. | 65/91 |

* cited by examiner

*Primary Examiner* — Matthew Daniels
*Assistant Examiner* — Erin Snelting
(74) *Attorney, Agent, or Firm* — Kevin M. Able; Stephen Wentsler

(57) ABSTRACT

Methods of producing a glass sheet comprise the step of fusion drawing a glass ribbon along a draw direction into a viscous zone downstream from a root of a forming wedge. The method further includes the steps of drawing the glass ribbon into a setting zone downstream from the viscous zone and an elastic zone downstream from the setting zone. The method also includes the step of creating a vacuum to force the entire lateral portion of the glass ribbon to engage an anvil portion of a breaking device in the elastic zone. The method still further includes the steps of forming a score line along the lateral portion of the glass ribbon and breaking away a glass sheet from the glass ribbon along the score line while the entire lateral portion is forced against the anvil portion by the vacuum.

17 Claims, 14 Drawing Sheets

METHODS OF PRODUCING GLASS SHEETS

TECHNICAL FIELD

The present invention relates generally to methods for producing glass sheets, and more particularly to methods of producing glass sheets by fusion drawing a glass ribbon from a root of a forming wedge.

BACKGROUND

Methods of manufacturing glass sheets are known to include the step of fusion drawing a glass ribbon from the root of a forming wedge. Once drawn from the root, the glass ribbon is set from a viscous state to an elastic state. After reaching the elastic state, the end portion of the glass ribbon is then periodically cut to provide a glass sheet having the desired length.

SUMMARY

The following presents a simplified summary of the disclosure in order to provide a basic understanding of some example aspects described in the detailed description.

In one example aspect, a method is provided for producing a glass sheet. The method includes the step of fusion drawing a glass ribbon along a draw direction into a viscous zone downstream from a root of a forming wedge. The glass ribbon includes opposed edges and a lateral portion extending between the opposed edges along a lateral direction transverse to the draw direction. The method further includes the step of drawing the glass ribbon into a setting zone downstream from the viscous zone, wherein the glass ribbon is set from a viscous state to an elastic state. The method also includes the steps of drawing the glass ribbon into an elastic zone downstream from the setting zone and creating a vacuum to force the entire lateral portion of the glass ribbon to engage an anvil portion of a breaking device in the elastic zone. The method further includes the steps of forming a score line along the lateral portion of the glass ribbon and breaking away a glass sheet from the glass ribbon along the score line while the entire lateral portion is forced against the anvil portion by the vacuum.

BRIEF DESCRIPTION OF THE DRAWINGS

These and other aspects are better understood when the following detailed description is read with reference to the accompanying drawings, in which.

DETAILED DESCRIPTION

Figure 1:
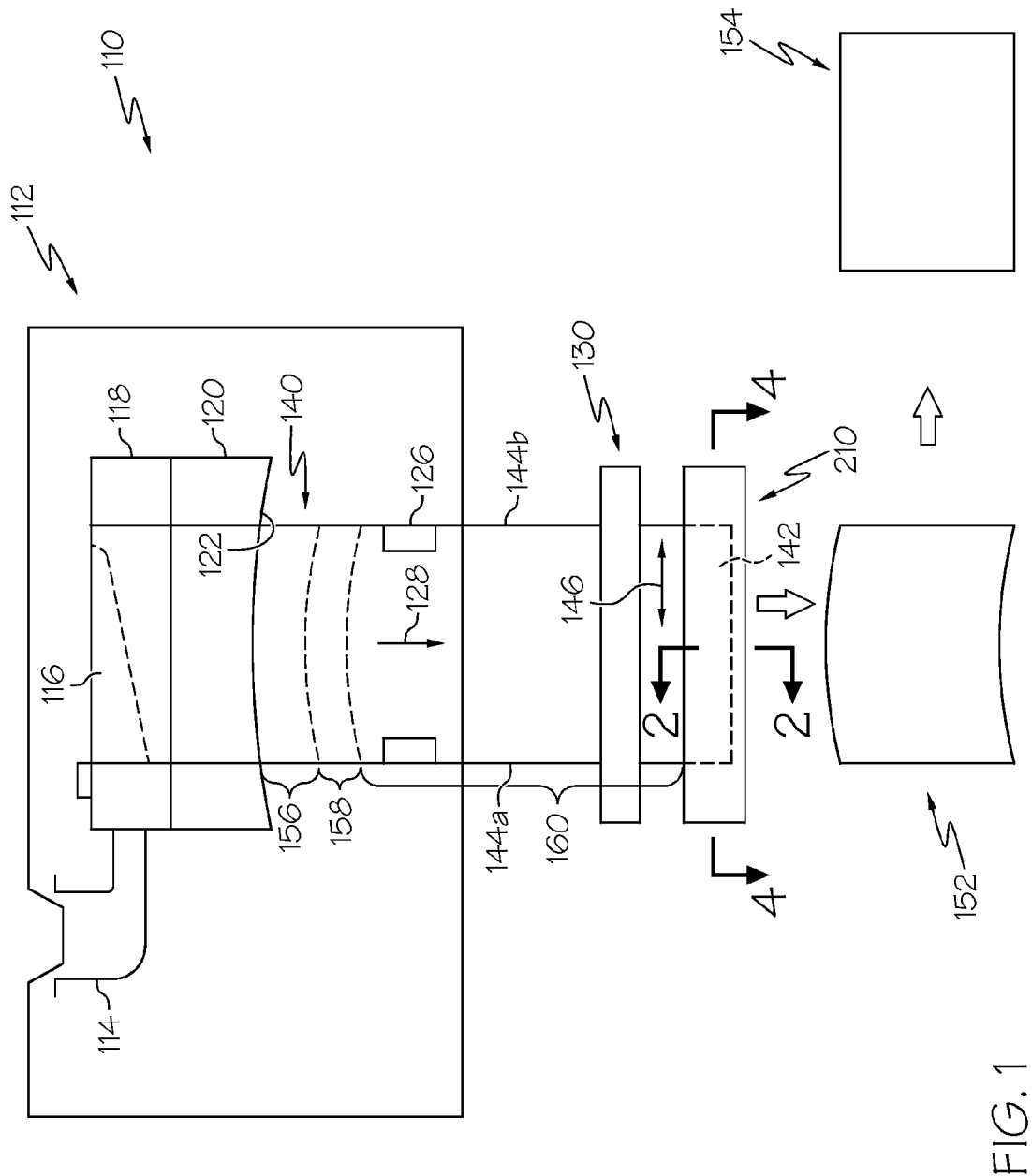
FIG. 1 is a schematic view of an example fusion drawing apparatus being used to produce a glass sheet.

Examples will now be described more fully hereinafter with reference to the accompanying drawings in which example embodiments are shown. Whenever possible, the same reference numerals are used throughout the drawings to refer to the same or like parts. However, aspects may be embodied in many different forms and should not be construed as limited to the embodiments set forth herein.

Methods herein can be incorporated with various fusion drawing apparatus designed to be used to fusion draw glass ribbon. The fusion drawing apparatus can include features disclosed in U.S. Pat. App. Pub. No. 2008/0131651 and U.S. Pat. Nos. 3,338,696 and 3,682,609 that are herein incorporated by reference in their entirety. One example fusion drawing apparatus 110 is illustrated schematically in FIG. 1. As shown, the fusion drawing apparatus 110 can include a fusion draw machine 112 configured to receive molten glass through an inlet 114 to be received in a trough 116 of a forming vessel 118. The forming vessel 118 can be provided with a forming wedge 120 configured to facilitate fusion drawing a glass ribbon 140 from a root 122 of the forming wedge 120 as discussed more fully below. A pull roll assembly 126 can facilitate pulling of the glass ribbon 140 in a draw direction 128. The fusion drawing apparatus 110 may optionally include a stabilization device 130 described more fully in U.S. patent application Ser. No. 12/607,474 filed Oct. 28, 2009 that is herein incorporated by reference in its entirety.

The fusion drawing apparatus 110 further includes a breaking device 210 schematically illustrated in FIG. 1. If provided, the stabilization device 130 is positioned upstream from the breaking device 210. As discussed more fully below, the breaking device 210 is configured to break away a glass sheet 152 that may be subdivided into individual display glass sheets 154 for incorporating in the various display devices, such as a liquid crystal display (LCD).

The breaking device 210 can comprise a stationary breaking device or a traveling breaking device. For example, as shown, the breaking device 210 comprises a traveling anvil machine that may move in the draw direction 128 during the process of scoring the glass ribbon and subsequently breaking the glass sheet 152 from the glass ribbon 140.

Figure 2:
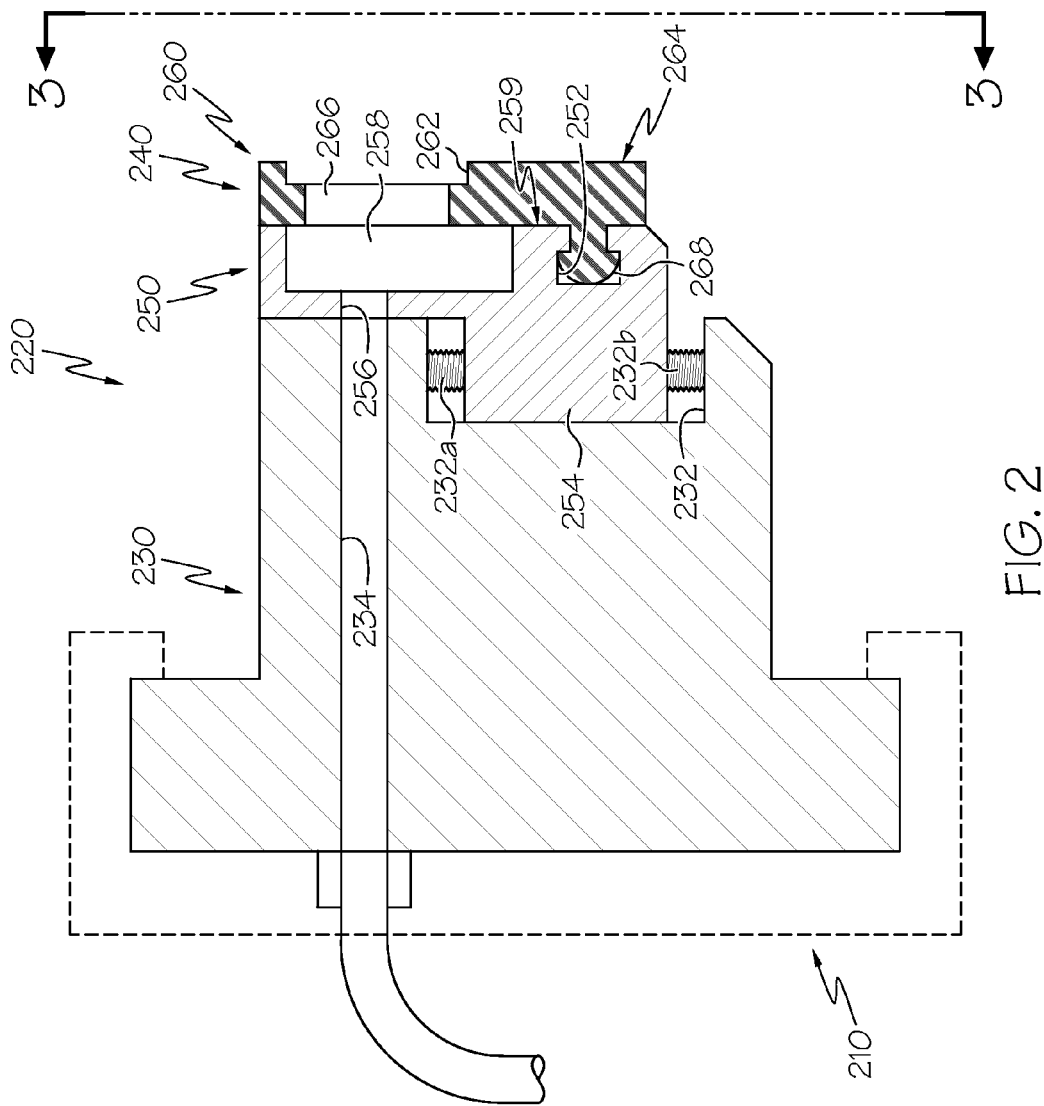
FIG. 2 is a cross sectional view along line 2-2 of FIG. 1, schematically illustrating features of an example anvil portion of the fusion drawing apparatus.

FIG. 2 is a cross sectional view along line 2-2 of FIG. 1, schematically illustrating various features of one example anvil portion 220 of the breaking device 210. The anvil portion 220 can include a support base 230 for mounting a nose member 240 relative to remaining portions of the breaking device 210. The nose member can include a wide range of configurations. In one example, the nose member can comprise a single integral part although the illustrated nose member includes a first part 250 mounted relative to the support base 230 and a second part 260 mounted relative to the first part 250.

Figure 4:
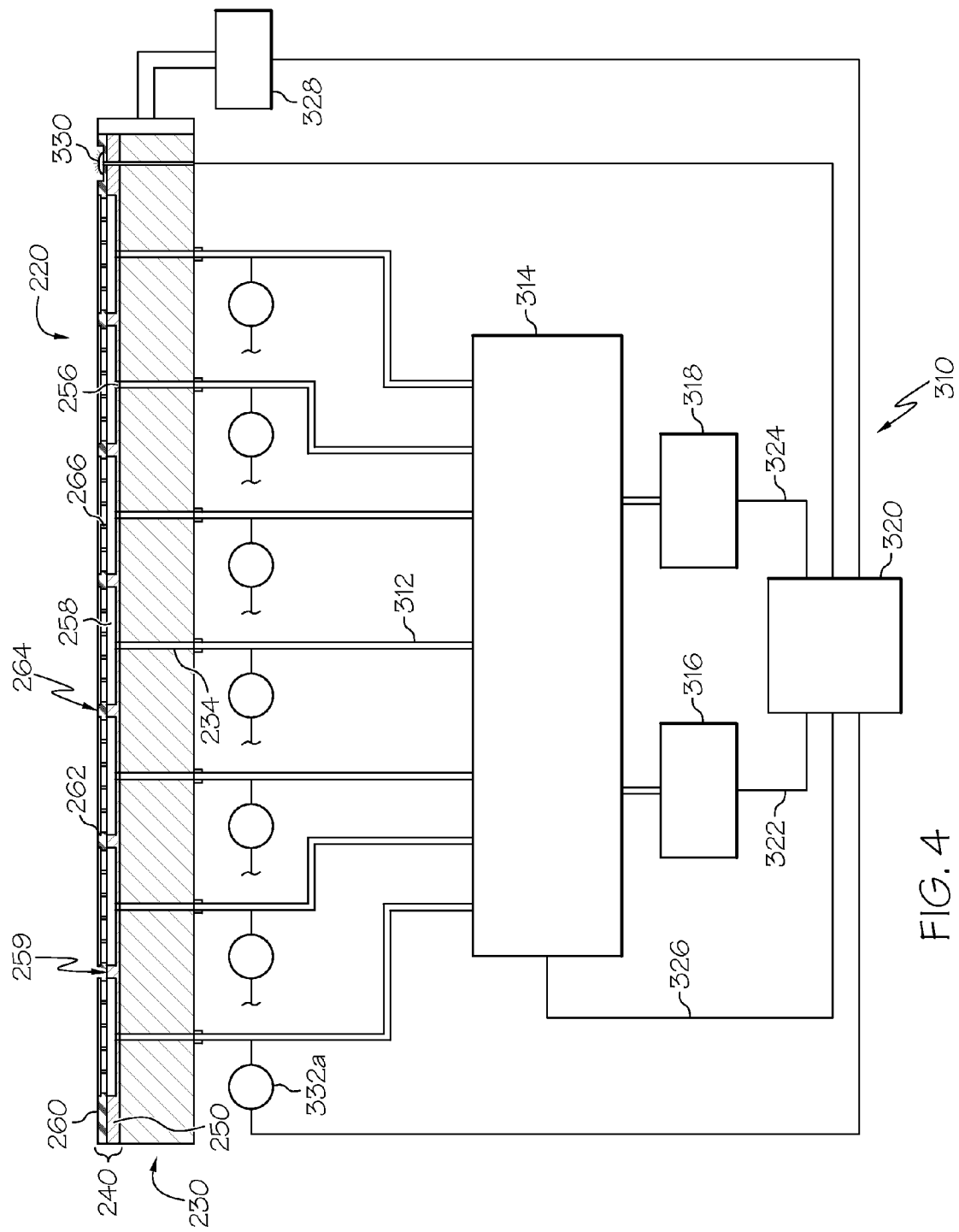
FIG. 4 is schematic cross sectional view along line 4-4 of FIG. 1, schematically illustrating features of the anvil portion.

The first part 250 includes a mounting extension 254 that may be received within a mounting channel 232 of the support base 230. With reference to FIGS. 2 and 4, the first part 250 can further include a plurality of apertures 256 that are each in line with a corresponding one of a plurality of bores 234 in the support base 230. Each aperture 256 is in fluid communication with a corresponding one of a plurality of recesses 258 within a bearing face 259. As illustrated, the bearing face 259 can comprise a substantially planar surface although other surface configurations may be provided in further examples. The first part 250 and the support base 230 may comprise substantially rigid materials such as various metals (e.g., steel), plastics, resins, composites or other materials.

As shown, the first part 250 may be mounted to the support base 230 by inserting the mounting extension 254 within the mounting channel 232 of the support base 230. One or more mounting members 232a, 232b, such as the illustrated set screws, may then be adjusted to lock the position of the first part 250 with respect to the support base 230. Alternatively, other clamping arrangements, interlocked configurations or other mounting techniques may be employed in further examples. In the illustrated example, the first part 250 may be removably mounted with respect to the support base 230 but may also be integrally mounted in further examples.

Figure 3:
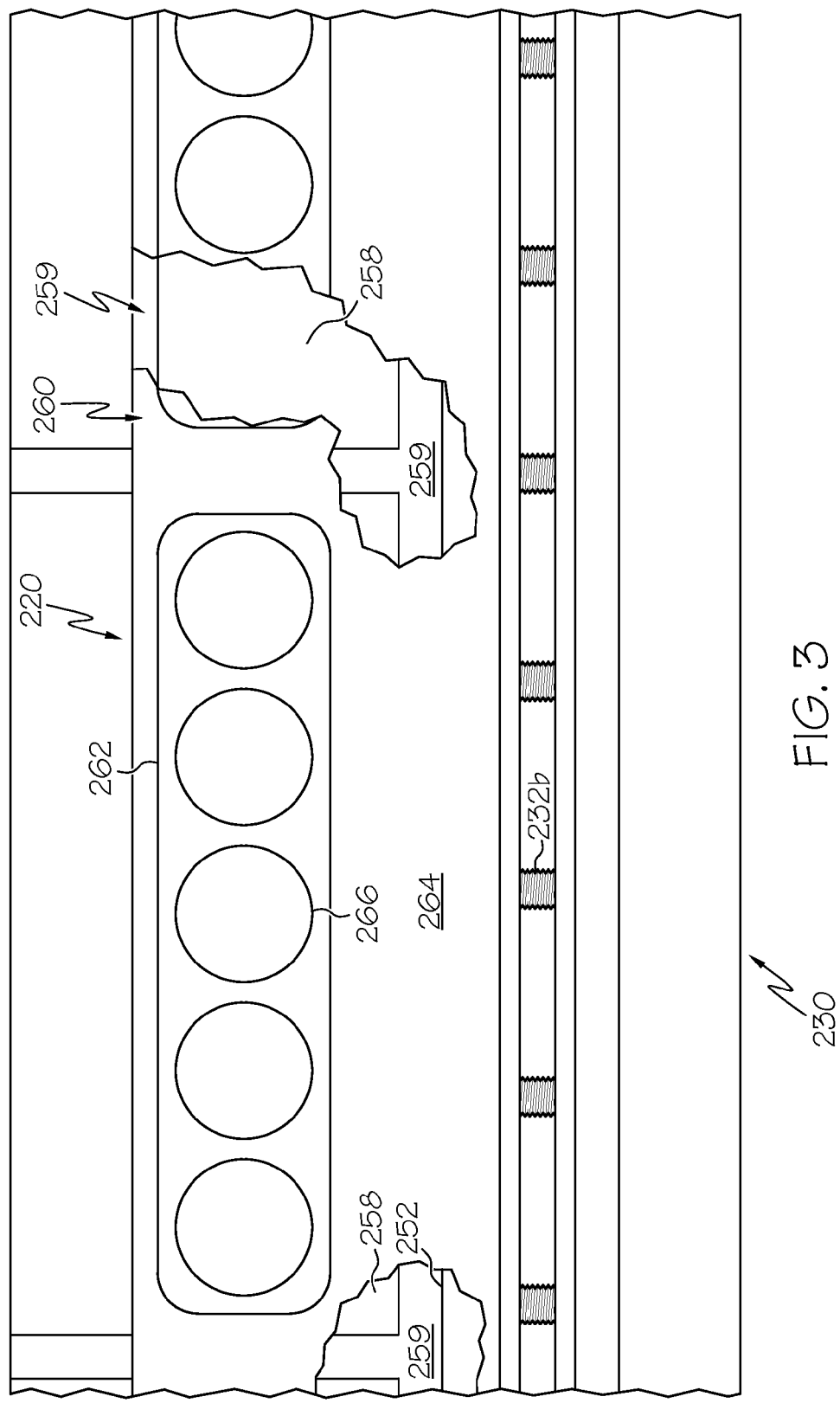
FIG. 3 is a front view of a section of the anvil portion viewed along line 3-3 of FIG. 2.

With reference to FIGS. 2, 3 and 4, the second part 260 may include a plurality of pressure ports 262 that are each recessed within an engagement surface 264. In one example, the engagement surface 264 may be substantially planar and match the bearing surface 259 of the first part 250. Each of the plurality of pressure ports 262 may be substantially identical to one another or have different sizes and/or shapes in further examples. As shown in FIG. 3, for example, the pressure ports 262 may comprise oblong recessed areas within the bearing surface 259 of the first part 250. Optionally, an array or other pattern of apertures 266 may be positioned to provide fluid communication with the pressure ports 262 and the corresponding recesses 258 of the first part 250.

The second part 260 may be removably mounted with respect to the first part 250. For instance, the second part 260 may include a mounting tongue 268 configured to be received by a mounting groove 252 of the first part 250. As such, the second part 260 may be easily removed for cleaning or replacement without disassembling the support base 230 from the remainder of the breaking device 210. Although not shown, adhesive may be provided between the first part 250 and the second part 260 to provide a secure interface between the first and second parts.

The second part 260 may comprise a wide range of resilient materials, such as silicone rubber. The example second part 260 may be formed as an extruded part that may be subsequently machined to provide the pressure ports 262 and the apertures 266. Alternatively, the second part 260 may be injection molded or formed with other manufacturing techniques. In still further examples, the second part and the first part may be made of substantially the same rigid material and may be integral or separate from one another. In such examples, the outer surface of the part may be coated or lined with a resilient material.

As shown in FIG. 4, the breaking device 210 may include a fluid control apparatus 310 operably connected to the anvil portion 220. As shown, a fluid conduit 312 may provide fluid communication between each of the plurality of bores 234 and a fluid control manifold 314. The fluid control manifold 314 is configured to selectively place each fluid conduit 312 in communication with at least one of a positive pressure source 316 and a negative pressure source 318.

A computer controller 320 may transmit commands along a transmission line 322 to control the positive pressure source 316. For example, the positive pressure source 316 may be a pressure pump wherein the computer controller 320 can send commands along a transmission line 322 to control operation of the pressure pump. Likewise, the computer controller 320 may transmit commands along another transmission line 324 to control the negative pressure source 318. For example, the negative pressure source 318 may comprise a vacuum pump wherein the computer controller 320 can send commands along the transmission line 324 to control operation of the vacuum pump. Still further, the computer controller 320 may also send signals along transmission line 326 to control operation of the fluid control manifold 314 depending on the desired pressure profile. In one example, the fluid control manifold 314 can cause at least one or all of the pressure ports 262 to be placed in fluid communication with the positive pressure source 316 and/or the negative pressure source 318. Therefore, it is possible for each of the plurality of pressure ports 262 to selectively act as either a fluid emitting port or a fluid vacuum port depending on the process parameters.

Placement of the anvil portion 220 can be achieved by way of an actuator 328. Indeed, the computer controller 320 can operate the actuator 328 to appropriately position the anvil portion 220 with respect to a first side of the glass ribbon 140. One or more optional proximity sensors 330 may be arranged to provide feedback to the computer controller 320 to facilitate automatic positioning of the anvil portion 220 with respect to the glass ribbon 140. Although a single proximity sensor is shown, a plurality of proximity sensors may be provided.

As still further illustrated in FIG. 4, each fluid conduit 312 may be provided with a pressure sensor (e.g., see 332a) that may each send feedback to the computer controller 320 to facilitate automatic adjustment of the pressure by way of the fluid control manifold 314 as discussed more fully below.

Methods of producing the glass sheet 152 will now be described. For example, as shown in FIG. 1, the fusion draw machine 112 receives molten glass through the inlet 114. The molten glass is then received in a trough 116 of the forming vessel 118. The molten glass eventually spills over the trough 116 and flows down in the draw direction 128 along opposite sides of the forming wedge 120. The molten glass continues to flow down the opposite sides of the forming wedge 120 until they encounter the root 122 of the forming wedge 120.

The molten glass is then fusion drawn as the glass ribbon 140 along the draw direction 128 into a viscous zone 156 downstream from the root 122 of the forming wedge 120.

As shown, the glass ribbon 140 includes a lateral portion 142 extending between opposed edges 144a, 144b along a lateral direction indicated by the double arrow 146. As shown, the lateral direction 146 can extend substantially perpendicular to the draw direction 128 in the direction of the width of the glass ribbon 140. In further examples, the lateral direction 146 may extend at an angle with respect to the draw direction 128.

Figure 5A:
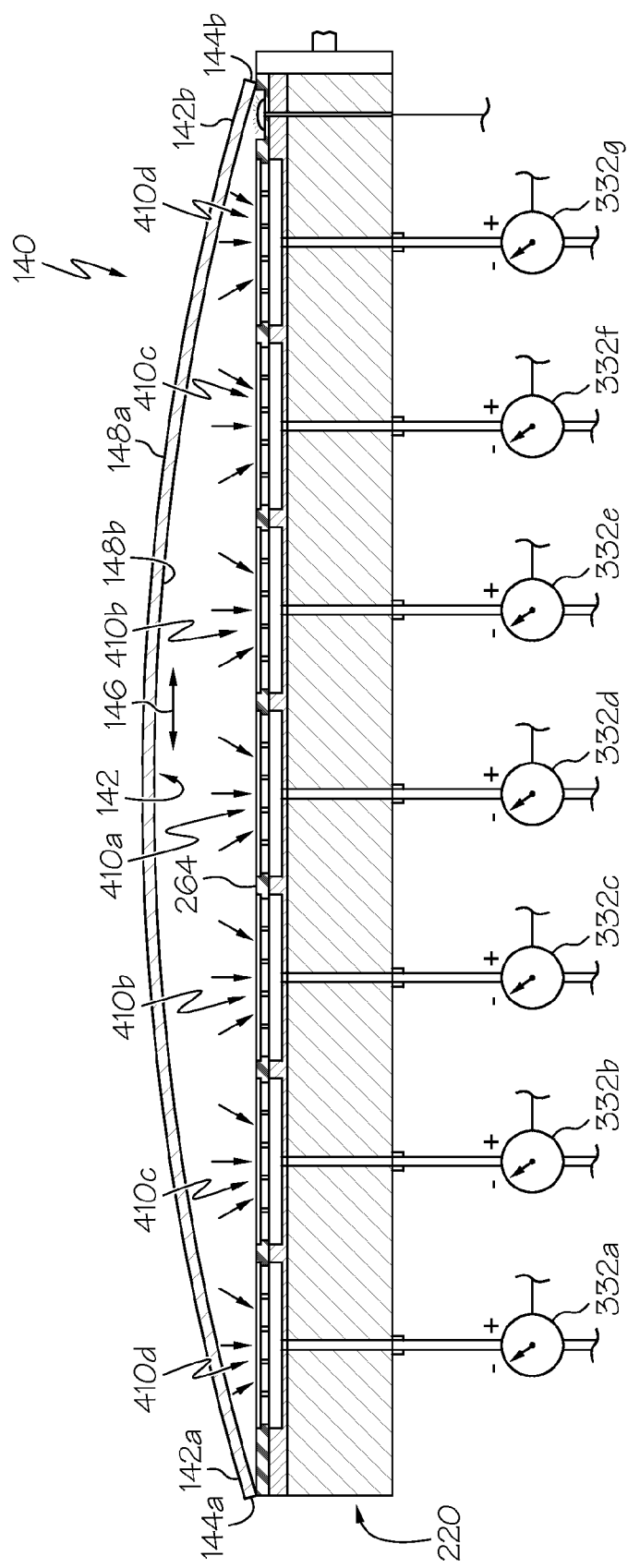
FIG. 5A is a schematic view of the anvil portion of FIG. 4 being placed with respect to a lateral portion of a glass ribbon.

The glass ribbon 140 can have a substantially straight or a substantially curved cross-sectional profile in a direction of the width of the glass ribbon. For example, as shown in FIG. 5A, the glass ribbon 140 may have a substantially curved cross-sectional profile in the direction of the width.

A substantially curved cross-sectional profile can be achieved with a wide variety of techniques. For instance, as shown the root 122 of the forming wedge 120 can be curved or otherwise configured to induce the curved cross-sectional profile in the viscous zone. In further examples, the curved cross-sectional profile may be achieved by way of techniques disclosed in U.S. Pat. Pub. No. 2008/0131651 that is herein incorporated by reference in its entirety.

Referring back to FIG. 1, the glass ribbon 140 may then travel along draw direction 128 into a setting zone 158 downstream from the viscous zone 156. In the setting zone 158, the glass ribbon is set from a viscous state to an elastic state with the desired cross-sectional profile. Once the glass ribbon is set in the elastic state, the profile of the glass ribbon in the viscous zone 156 is frozen as a characteristic of the ribbon. The profile of the glass ribbon in the viscous zone 156 is carried through to the setting zone 158. Thus, as shown, the substantially curved cross-sectional profile may be carried through from the viscous zone 156 to the setting zone 158 wherein the profile is frozen as a characteristic of the ribbon. While the set ribbon may be flexed away from this configuration, internal stresses will cause the glass ribbon to bias back to the original set profile and, in extreme cases, may cause the ribbon to overextend into a different orientation.

As further shown, the same substantially curved cross-sectional profile from the viscous zone 156 and the setting zone 158 can be carried through to the elastic zone 160. In fact, as shown, throughout each of the zones 156, 158, 160, the glass ribbon 140 may have substantially the same cross-sectional profile in a direction of the width of the glass ribbon 140. In further examples, the glass ribbon 140 may be curved to different degrees or may even have different curvatures throughout the elastic zone 160. Thus, the substantially curved cross-sectional profile can exist substantially continuously through each of the zones 156, 158, 160 wherein, as shown in FIG. 5A, a first side 148a of the glass ribbon 140 includes a convex surface and the second side 148b of the glass ribbon 140 includes a concave surface.

As mentioned previously, the glass ribbon 140 may include other profile configurations such as a substantially straight cross sectional profile that can extend continuously through each of the zones 156, 158, 160. Thus, the root 122 of the forming wedge 120 may be substantially straight or otherwise configured to form a substantially flat ribbon in the viscous zone 156. In still further examples, the glass ribbon 140 may have different cross-sectional profiles. For example, the glass ribbon may be formed with the first side 148a including a concave surface and the second side 148b including a convex surface. As shown, the cross-sectional profile may comprise a single curve although further profiles may have a sinusoidal curve or other curvilinear shape. Still further, the cross-sectional profile may change as it travels in the draw direction 128. For example, one or more different profiles may exist in the viscous zone 156, the setting zone 158 and or the elastic zone 160. For example, one or more straight, single curve, sinusoidal curve or other shape may exist at various locations along the draw direction 128 of the glass ribbon 140.

As further illustrated in FIG. 1, a pull roll assembly 126 may be provided to facilitate drawing of the glass ribbon 140 from the root 122 in the draw direction 128. As such, the draw rate, thickness and other characteristics of the glass ribbon 140 can be controlled.

Optionally, as shown in FIG. 1, a region of the glass within the elastic zone 160 may be stabilized by way of the stabilization device 130. Example stabilization devices and methods of stabilizing are discussed in more fully in U.S. patent application Ser. No. 12/607,474 filed Oct. 28, 2009 that is herein incorporated by reference in its entirety. As shown, the stabilization device 130 is separate from the breaking device 210 although the stabilization device 130 and the breaking device 210 may be provided as a single device in further examples. Moreover, as shown, the stabilization device 130 is located immediately upstream of the breaking device 210 although the stabilization device 130 may be provided in one or more other locations in further examples. For instance, the stabilization device 130 may be located further upstream within the elastic zone 160. Still further, a plurality of stabilization devices 130 may be provided at various locations along the elastic zone 160. For instance, two or more stabilization devices 130 may be provided at spaced locations along the elastic zone 160.

Once the glass ribbon 140 is drawn sufficiently within the elastic zone 160, the glass sheet 152 may be broken away from the end of the glass ribbon 140. The anvil portion 220 may be manually or automatically adjusted to the appropriate position with respect to the lateral portion 142 of the glass ribbon 140. For example, the computer controller 320 may obtain feedback from the one or more proximity sensors 330. Based on the feedback from the sensors, the computer controller 320 may command the actuator 328 to appropriately position the anvil portion 220 with respect to the glass ribbon 140.

As shown in FIG. 5A for example, the anvil portion 220 may be positioned with respect to the glass ribbon 140 to be adjacent the second side 148b (e.g., concave side) of the glass ribbon along the lateral portion 142. A vacuum may be created by one or more pressure zones. For instance, as shown, a plurality of pressure zones 410a-d may be spaced along the width of the anvil portion 220. In the schematic illustration the plurality of pressure zones includes a central pressure zone 410a straddled by a first pair of pressure zones 410b and sequentially straddled by a second and third pair of pressure zones 410c, 410d, respectively. While seven pressure zones are illustrated, more or less pressure zones may be provided in further examples. In the illustrated example, the pressure zones may be created by way of the pressure ports 262 recessed within an engagement surface 264 of the second part 260 of the nose member 240. The fluid control manifold 314 may operate to place the pressure ports 262 in selective communication with one or both of the positive pressure source 316 or negative pressure source 318 such that each pressure port 262 may selectively provide a corresponding positive pressure zone or vacuum zone having various pressure magnitudes.

The method can further include the step of creating a vacuum to force the entire lateral portion 142 of the glass ribbon 140 to engage the anvil portion 220 of the breaking device 210 in the elastic zone 160. The vacuum force from the pressure ports 262 may be sufficient to draw the lateral portion 142 of the glass ribbon 140 to engage the anvil portion 220. In one example, the pressure zones are operated independent from one another as the glass ribbon engages the anvil portion. Independent operation, either in sequence or otherwise, can control the process of flattening out the glass ribbon 140 against the anvil portion 220. For example, one or more of the outermost pressure ports may be operated at a significantly higher vacuum to bring at least one of the side portions 142a, 142b in contact with the anvil portion 220. For example, as shown in FIG. 5A, the outer most ports 262 may be operated such that the outer pair of pressure zones 410d have a significantly greater vacuum than the central pressure zone 410a and remaining pressure zones. As such, the vacuum provided by the negative pressure source 318 may be focused on the outermost pair of pressure zones 410d to draw the side portions 142a, 142b into contact with the anvil portion 220. Then the next pair of pressure zones 410c may be operated, in sequence, to provide a relatively high suction compared to the remaining pressure zones. This sequential process can continue until the entire lateral portion 142 is engaged with the engagement surface 264 provided by the second part 260 of the nose member 240. Sequentially adjusting the vacuum pressure from the sides of the anvil portion 220 toward the center of the anvil portion 220 can prevent snapping of the ribbon against the anvil portion 220 that may otherwise generate vibrations that can propagate upstream through the glass ribbon 140 into the setting zone 158.

Figure 5B:
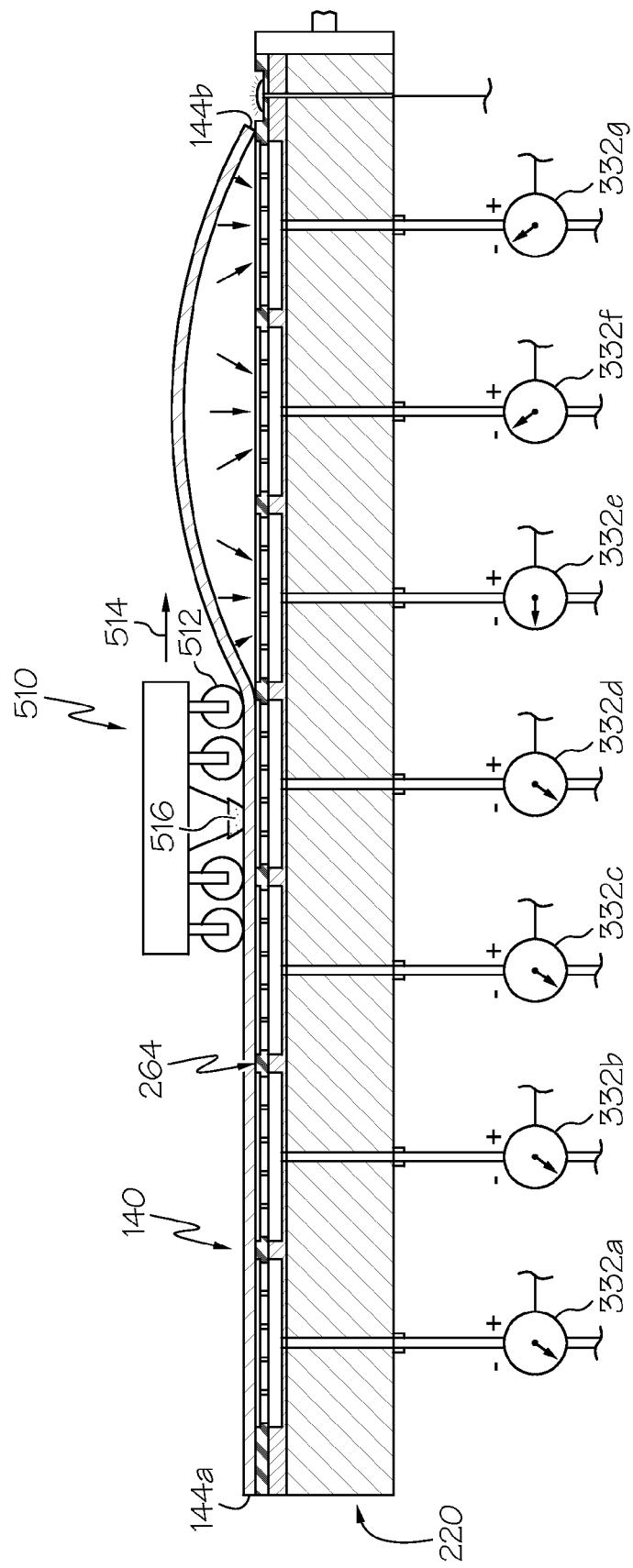
FIG. 5B is a schematic view of the lateral portion of the glass ribbon of FIG. 4 being flattened out against the anvil portion with a pressing device.

Alternatively, a pressing device may be used to flatten out the lateral portion of the glass ribbon against the anvil portion. The pressing device may comprise a pressing bar, or other contact mechanism. In the illustrated example, the pressing device comprises a roller device 510 including a series of rollers 512 configured to roll across the first side 148a of the glass ribbon 140 along linear direction 514. As the roller presses the glass sheet against the anvil portion, the vacuum thereafter prevents the glass ribbon 140 from returning to the nonlinear profile before breaking away the glass sheet 152 from the glass ribbon 140 as discussed more fully below. Moreover, the pressure ports may operate sequentially in concert with the pressing device such that the entire lateral portion 142 of the glass ribbon 140 is engaged with the anvil portion 220. For instance, as illustrated in FIG. 5A by the arrows of the pressure sensors 332a-g, a relatively weak pressure zone can be initially provided. Turning to FIG. 5B, as indicated by the arrows of the pressure sensors 332a-d, once the pressing device begins flattening out the glass ribbon 140, the vacuum of the pressure zones may be sequentially increased to firmly hold the flattened extent of the lateral portion 142 against the engagement surface 264. As indicated by the arrow of pressure sensor 332e, the vacuum of the pressure zone in front of the pressing member may also be increased to help pull the glass ribbon against the anvil portion 220 before being flattened by the rollers 512. As such, vibrations can be avoided that might otherwise result from snapping of the glass ribbon 140 against the anvil portion 220. Once fully engaged, as indicated by the arrows of pressure sensors 332a-g in FIG. 5C, the vacuum of all of the pressure zones can be increased to help firmly hold the entire lateral portion 142 against the engagement surface 264. Individual and/or sequential control of the vacuum zones can reduce vibrations from propagating up the ribbon to the setting zone 158 where internal stresses and/or shape variabilities may be frozen into the glass ribbon. Moreover, providing the second part 260 with a resilient material (e.g., silicone rubber) can further help absorb vibrations from the process of engaging the lateral portion of the glass ribbon with the anvil portion of the breaking device.

Figure 6:
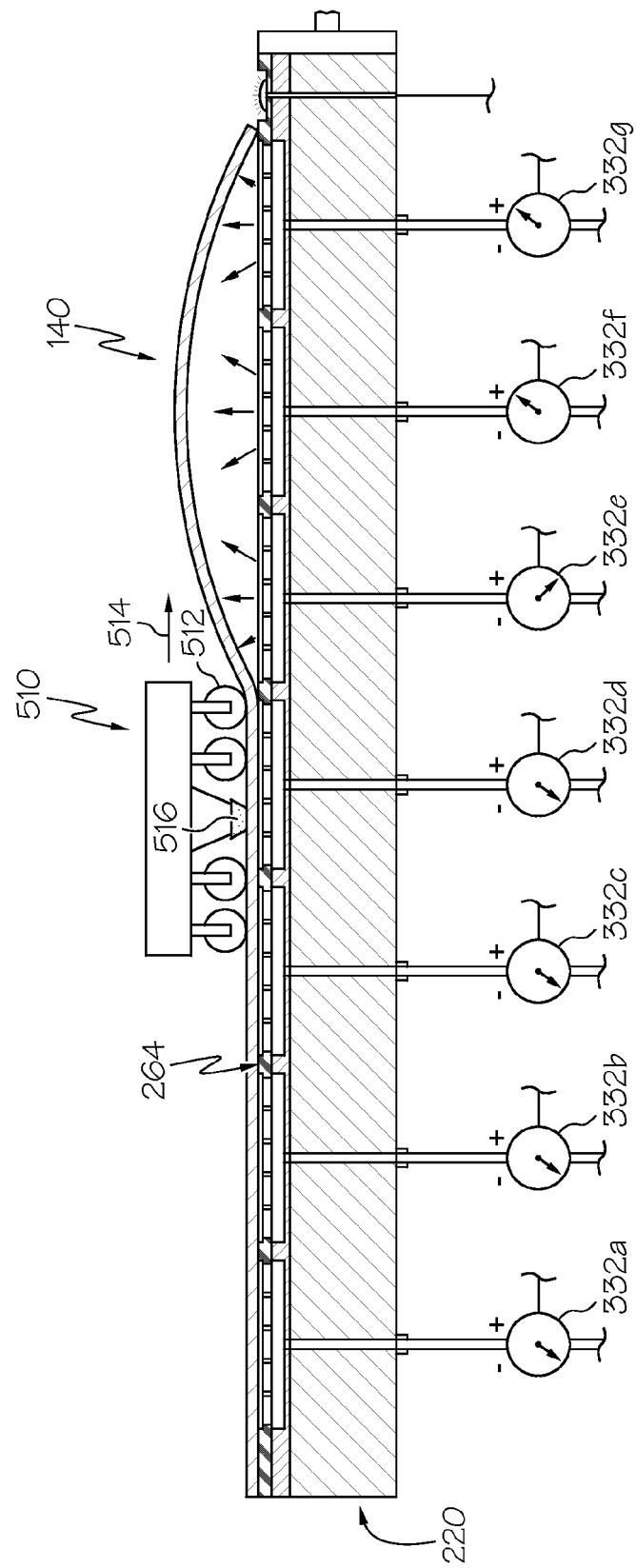
FIG. 6 is another example of the lateral portion of the glass ribbon being flattened out against the anvil portion with a pressing device.

In further examples, the pressure zones may operate at a positive pressure as the lateral portion 142 is engaged with the anvil portion 220. Indeed, as indicated by the arrows of pressure sensor 332e in FIG. 6, the pressure zone may operate at a maximum pressure just prior to engagement by the roller to help prevent snapping. Once engaged, the pressure zone can be operated at a significant vacuum as indicated by pressure sensors 332a-d. Pressure zones further away from the pressing member may be operated at a reduced compressed air (see 332f-g) and may even operate with a slight vacuum.

Figure 5C:
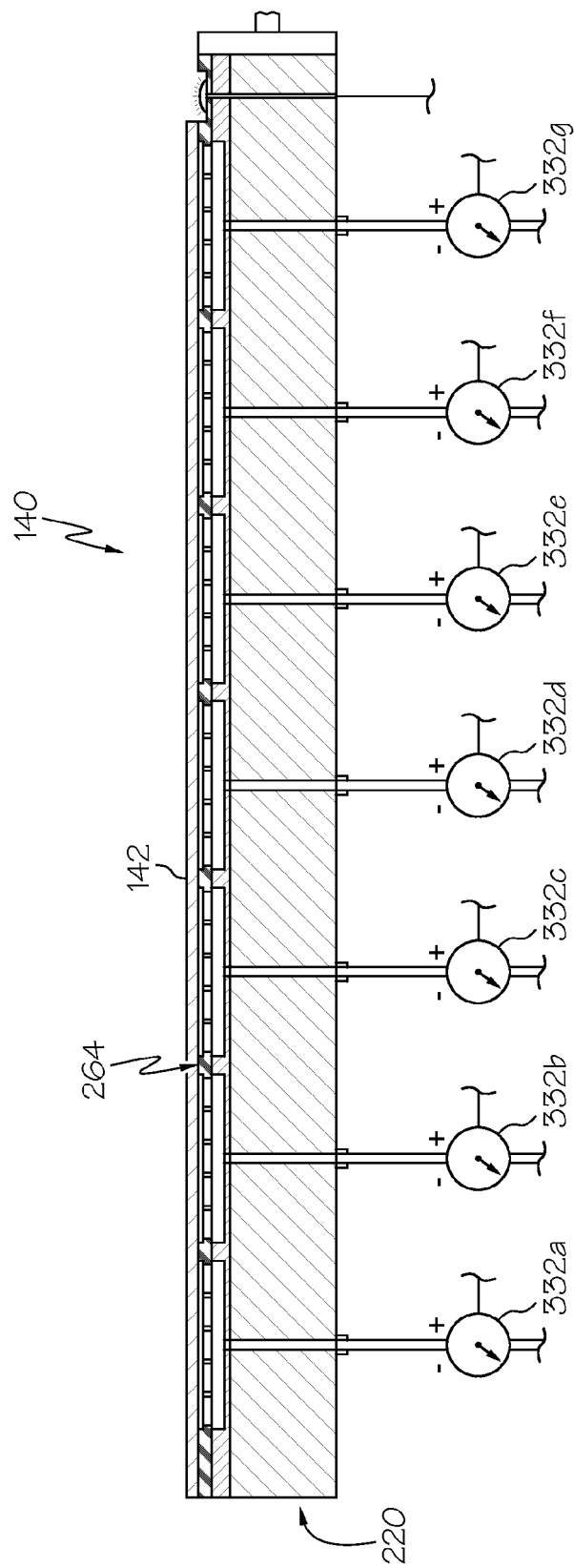
FIG. 5C is a schematic view of a vacuum holding the lateral portion of the glass ribbon along a substantially straight cross-sectional profile against the anvil portion.

As shown in FIG. 5C, the lateral portion 142 may be flattened out to maintain a linear profile. A linear profile can be achieved by providing the illustrated planar engagement surface 264. It will be appreciated that other non-planar engagement surfaces may be provided in further examples.

The method may further include the step of forming a score line along the lateral portion 142 of the glass ribbon 140. The score line comprise a continuous score line extending between the side portions 142a, 142b although the score line may comprise a dashed score line, a perforated line or other score configuration. Various scoring devices may be used in accordance with aspects of the present disclosure. For example, scoring devices may comprise laser devices, mechanical scoring devices and/or devices to otherwise score the glass ribbon. As shown, the scoring device 516 comprises a diamond point scriber or diamond wheel scriber although other scoring structures may be used in further examples.

The scoring process may be initiated after the entire lateral portion 142 is forced to engage the anvil portion 220 by the vacuum. Alternatively, as shown in FIG. 5B, the step of forming the score line with the scoring device 516 is initiated before the entire lateral portion 142 of the glass ribbon 140 engages the anvil portion 220. Such a procedure may reduce overall processing time to increase manufacturing efficiency.

Figure 7A:
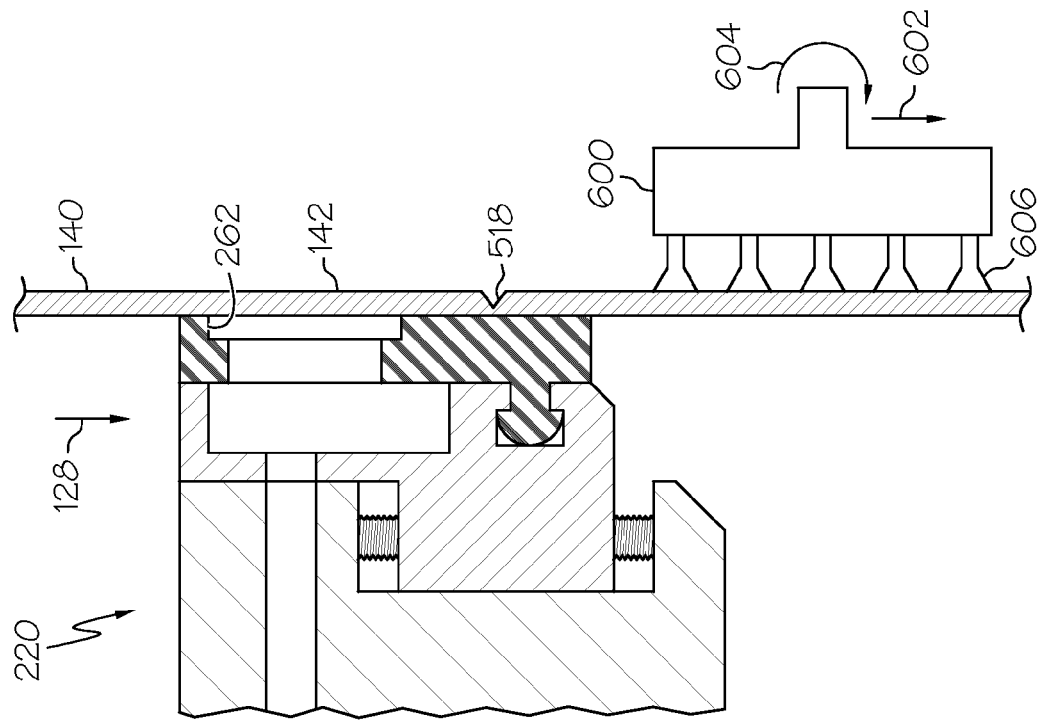
FIG. 7A is a cross sectional view along line 2-2 of FIG. 1, illustrating the step of forming a score line along the lateral portion of the glass ribbon.

FIGS. 7A-7D schematically illustrate methods steps of forming a score line 518 along the lateral portion 142 of the glass ribbon 140 and breaking away the glass sheet 152 from the glass ribbon 140 along the score line 518 while the entire lateral portion 142 is forced against the anvil portion 220 by the vacuum. As shown in FIG. 7A, the scoring device 516 forms a score line 518 within the glass ribbon 140 such that the at least one pressure port 262 is positioned at a higher elevation with respect to the score line 518. After scoring, the entire lateral portion 142 of the glass ribbon is flattened against the anvil portion 220, wherein the vacuum thereafter prevents the glass ribbon 140 from returning to the nonlinear profile before breaking away the glass sheet 152 from the glass ribbon 140.

Figure 7B:
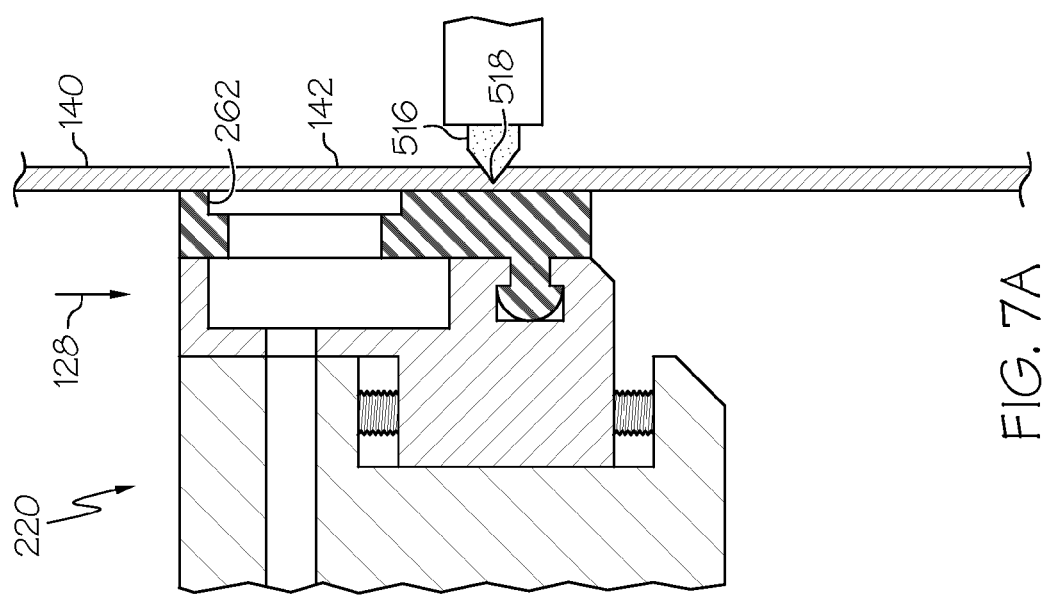
FIG. 7B is a cross sectional view similar to FIG. 7A wherein suction member engages a portion of the glass ribbon below the score line.

As shown in FIG. 7B, a gripping device 600 may then grip the segregated portion of the glass ribbon below the score line 518, for example, adjacent the opposed edges 144a, 144b of the glass ribbon 140. Next, the gripping device 600 may be pulled downward along direction 602 and or rotated about direction 604 to allow the glass sheet to break away from the glass ribbon along the score line while the entire lateral portion is forced against the anvil portion by the vacuum. A wide range of gripping devices may be used in accordance with aspects of the disclosure. In the illustrated example, the gripping device 600 may comprise a suction carriage with a vertical column of suction members 606 designed to only grip the outer edges portions of the glass ribbon 140.

Figure 7C:
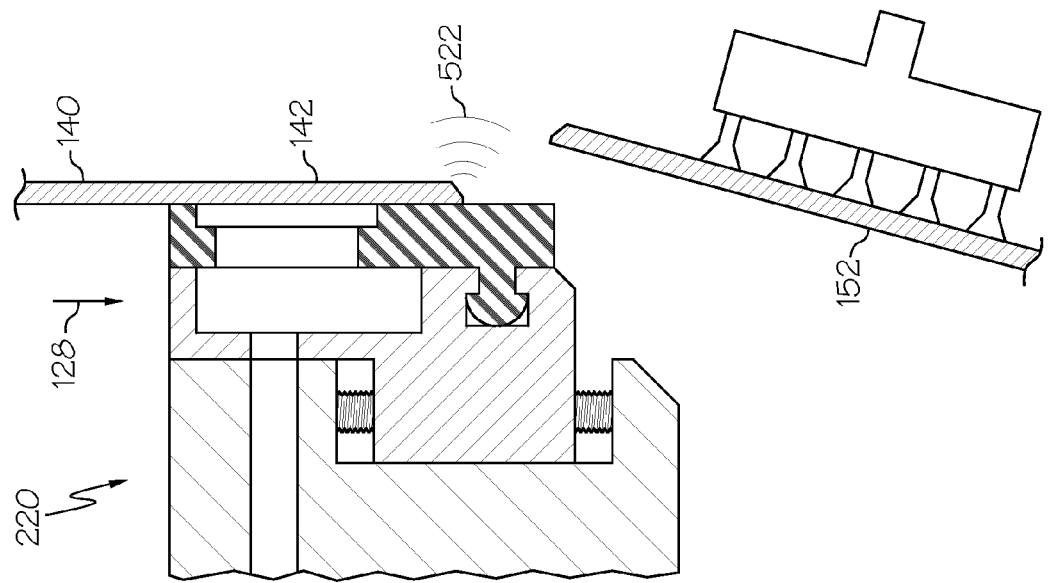
FIG. 7C is a cross sectional view similar to FIG. 7B wherein the suction member begins breaking away the glass sheet from the glass ribbon along the score line.

FIG. 7C illustrates rotation of the glass sheet 152 about the score line 518 while the lateral portion 142 is firmly held against the engagement surface 264 by the vacuum. Firmly holding the lateral portion 142 against the engagement surface 264 can increase stress concentrations at the score line 518 during the breaking process, thereby reducing the forces necessary to break away the glass sheet 152 from the ribbon. Moreover, the lower edge of the resilient second part 260 can compress and provide a reaction force indicated at arrow 520 that may further facilitate cracking along the score line 518 without damaging the upper portion of the glass sheet 152 in the process.

Figure 7D:
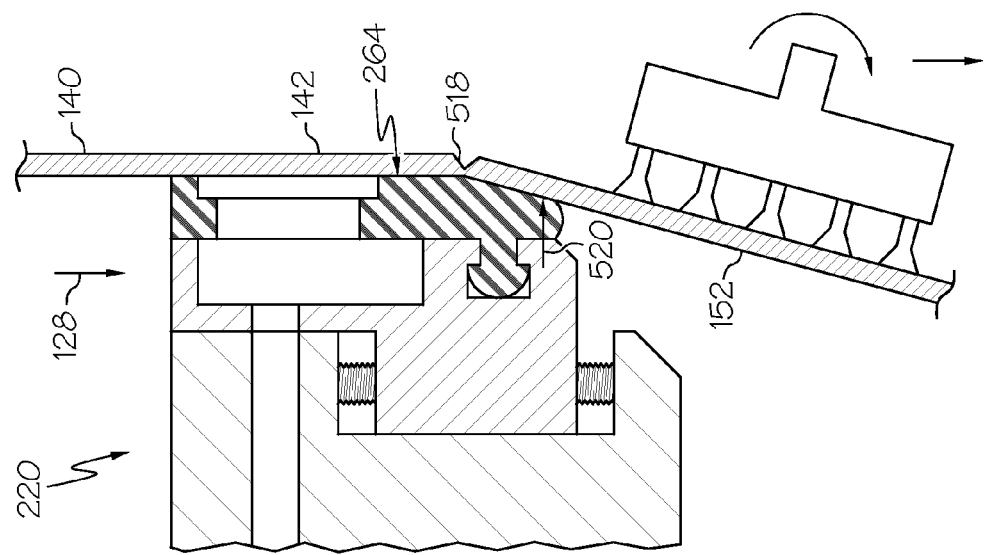
FIG. 7D is a cross sectional view similar to FIG. 7C wherein the suction member has completed the process of breaking away the glass sheet from the glass ribbon.

FIG. 7D illustrates the glass sheet 152 broken away from the glass ribbon 140 wherein the resilient second part 260 may absorb vibrations 522, thereby preventing the vibrations from propagating up through the glass ribbon. If provided, the stabilization device 130 may further reduce any consequences from any vibrations that are not absorbed by the resilient second part 260.

Once broken away, the lateral portion 142 of the glass ribbon 140 remains firmly held against the engagement surface 264. A controlled release of the lateral portion 142 from the engagement surface 264 may then be performed to help disengage the lateral portion from the engagement surface while preventing swinging of the glass ribbon or prevent vibrations from propagating up the glass ribbon. For instance, the vacuum force from the central pressure zone may be reduced to begin releasing the central area of the lateral portion before side pressure zones begin releasing side areas of the lateral portion.

Figure 8A:
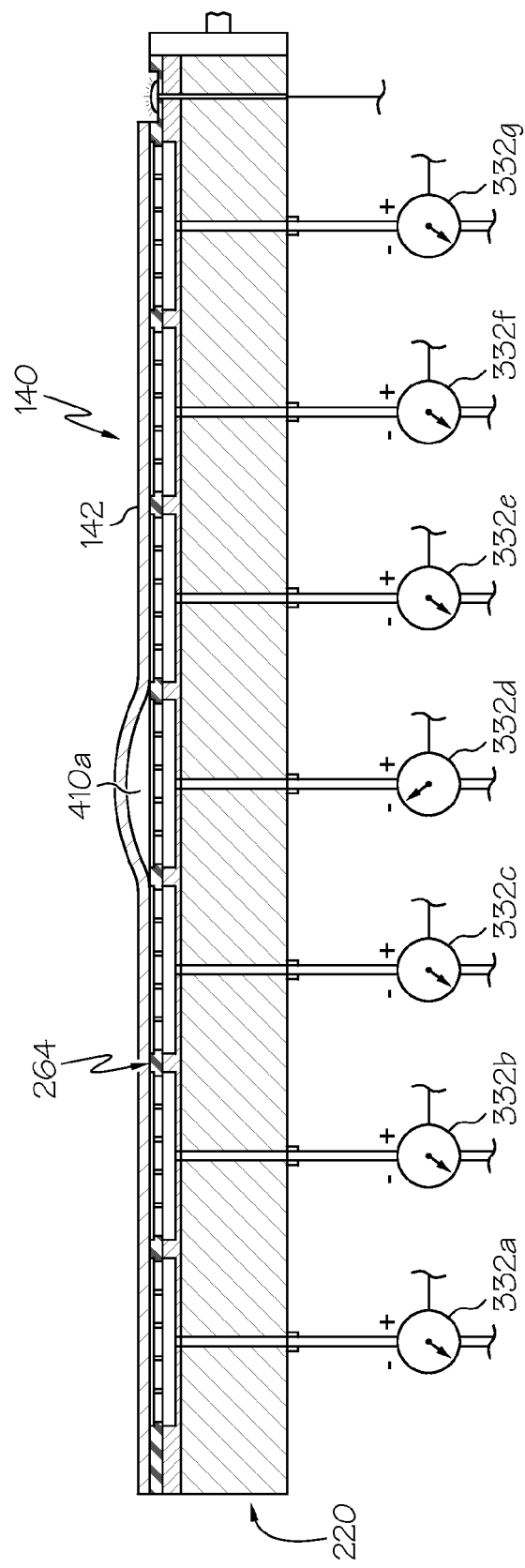
FIG. 8A is a schematic view, similar to FIG. 5C illustrating an example of the vacuum force from a central pressure zone being reduced to begin releasing a central area of the lateral portion before a pair of side pressure zones begins releasing side areas of the lateral portion.
Figure 8B:
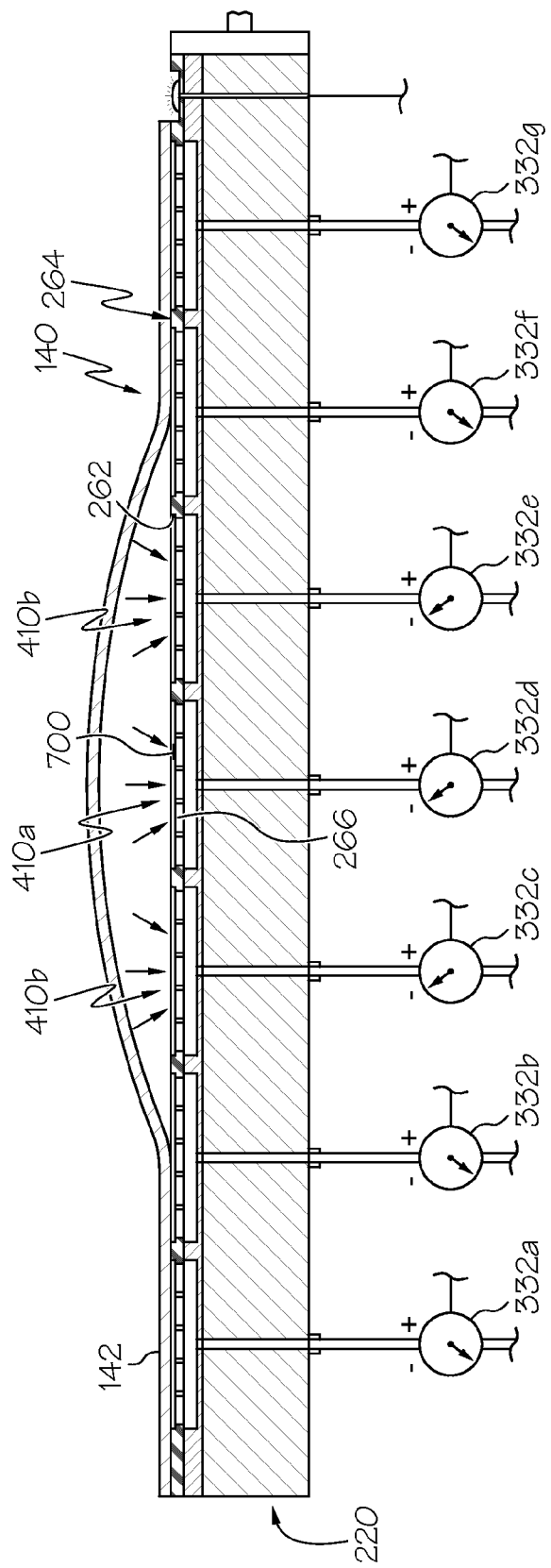
FIG. 8B is a schematic view, similar to FIG. 8A illustrating the vacuum force of outer pairs of pressure zones being sequentially reduced while releasing the lateral portion from the anvil portion.

FIGS. 8A and 8B illustrate one method of releasing the lateral portion 142 from the engagement surface 264. As indicated by pressure sensors 332*d* in FIG. 8A, the vacuum associated with the central pressure zone 410*a* may be reduced before reducing the vacuum associated with the remaining pressure zones. As such, the central area of the lateral portion 142 begins retaining its original shape while the remainder of the lateral portion 142 remains firmly held against the engagement surface 264. As shown in FIG. 8B, the vacuum associated with the pair of pressure zones 410*b* is then sequentially reduced such that further portions of the lateral portion 142 continue to gradually return to the original profile shape. The process can be continued until the original shape illustrated in FIG. 5A is achieved. Controlling the release of the lateral portion can help prevent vibrations and/or popping of the glass ribbon into different higher energy profile shapes.

As shown in FIGS. 3 and 8B one or all of the pressure ports 262 may be provided with a plurality of apertures 266. As shown, the apertures can filter glass particles 700 from flowing through the pressure port. Furthermore, the plurality of apertures can control fluid flow through the pressure port, thereby distributing the fluid flow evenly or at a desired pattern. The apertures may also control the fluid by acting as a fluid flow restrictor to help provide the desired pressure characteristics at the pressure port.

Figure 9A:
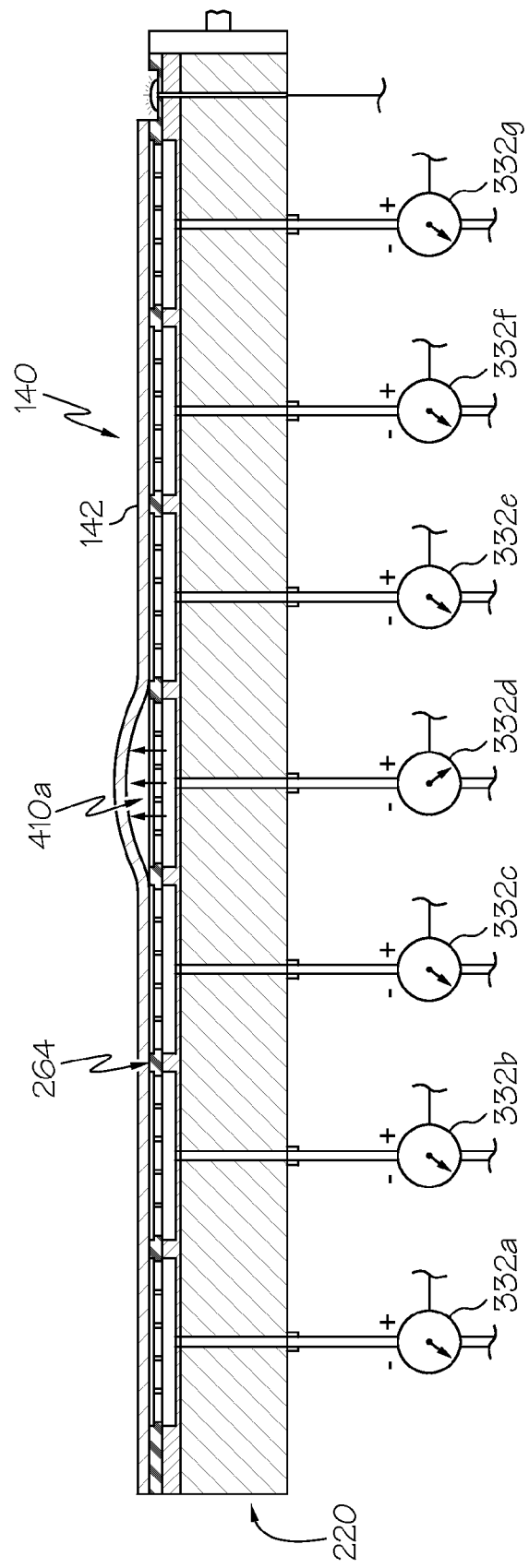
FIG. 9A is a schematic view, similar to FIG. 5C illustrating another example of the vacuum force from a central pressure zone being reduced to begin releasing a central area of the lateral portion before a pair of side pressure zones begins releasing side areas of the lateral portion.
Figure 9B:
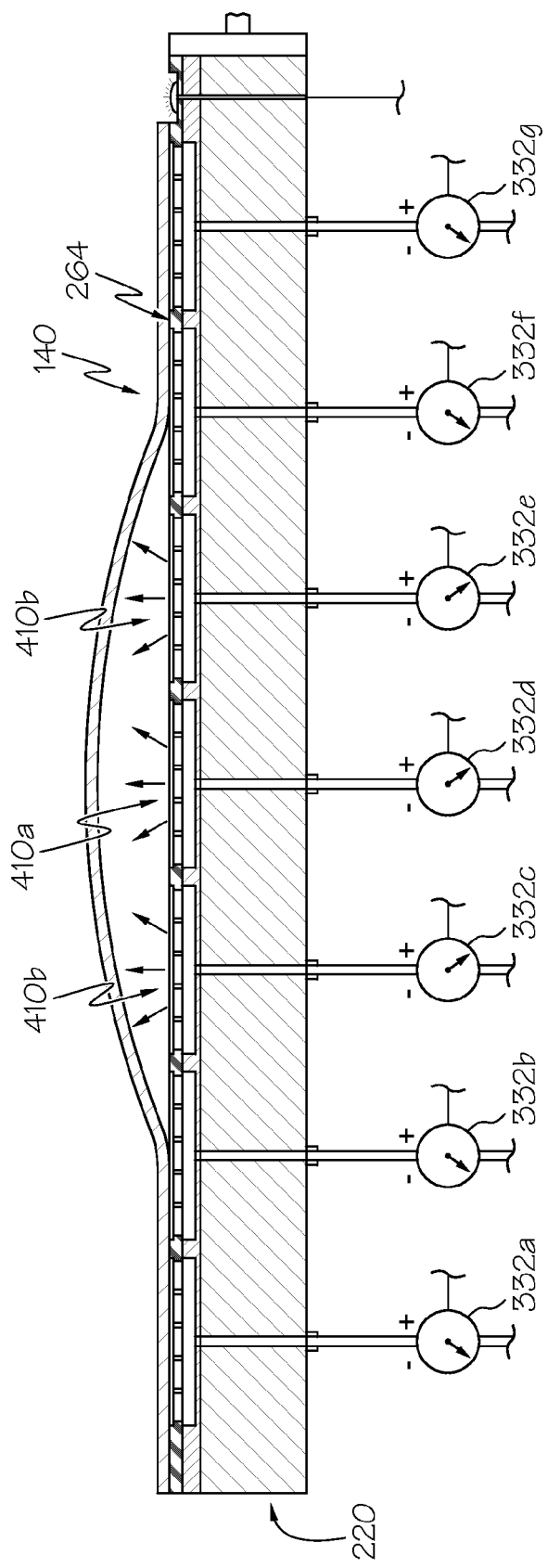
FIG. 9B is a schematic view, similar to FIG. 9A illustrating the vacuum force of outer pairs of pressure zones being sequentially reduced while releasing the lateral portion from the anvil portion.

FIGS. 9A and 9B illustrate another example of the vacuum force from the central pressure zone being reduced to begin the releasing process. Indeed, as shown, the vacuum force may be completely eliminated and replaced with the positive pressure. FIG. 9A demonstrates the central pressure zone 410*a* including a positive pressure forcing the central area of the lateral portion 142 away from the engagement surface 264 while the remaining pressure zones provide the vacuum force to prevent full disengagement. As shown in FIG. 9B, pairs of pressure zones 410*b*, 410*c* are then sequentially switched from a vacuum to a positive pressure configuration to continue disengagement of the lateral portion 142 from the engagement surface 264.

As shown, the entire breaking away process may be carried out by a traveling anvil machine. Indeed, as shown in FIGS. 7A, 7B, 7C, 7D, the anvil portion 220 may travel together with the glass ribbon 140 in the travel direction 128 so there is substantially no relative vertical movement of the anvil portion 220 with respect to the glass ribbon 140.

It will be apparent to those skilled in the art that various modifications and variations can be made without departing from the spirit and scope of the claimed invention.

What is claimed is:

1. A method of producing a glass sheet comprising the steps of:

fusion drawing a glass ribbon along a draw direction into a viscous zone downstream from a root of a forming wedge, wherein the glass ribbon includes opposed edges and a lateral portion extending between the opposed edges along a lateral direction transverse to the draw direction;

drawing the glass ribbon into a setting zone downstream from the viscous zone, wherein the glass ribbon is set from a viscous state to an elastic state;

drawing the glass ribbon into an elastic zone downstream from the setting zone, wherein the lateral portion of the glass ribbon in the elastic zone includes a profile shape along the lateral direction comprising a substantially curved set profile shape;

creating a vacuum to force the entire lateral portion of the glass ribbon to engage an anvil portion of a breaking device in the elastic zone, wherein the glass ribbon is held such that the profile shape of the lateral portion of the glass ribbon comprises a substantially planar engaged profile shape that substantially matches a shape of the anvil portion, and wherein the vacuum is provided by a plurality of pressure zones that are operated independent from one another;

forming a score line along the lateral portion of the glass ribbon;

breaking away a glass sheet from the glass ribbon along the score line while the entire lateral portion of the glass ribbon is forced against the anvil portion by the vacuum; and then releasing the glass ribbon from the anvil portion such that the profile shape of the glass ribbon does not match the engaged profile shape.

2. The method of claim 1, wherein, the plurality of pressure zones includes at least one central pressure zone straddled by at least one pair of side pressure zones, wherein, after the step of breaking away the glass sheet, the vacuum force from the central pressure zone is reduced to begin releasing a central area of the lateral portion before the pair of side pressure zones begins releasing side areas of the lateral portion.

3. The method of claim 2, wherein, after the step of breaking away the glass sheet, a positive pressure is applied by the central pressure zone to force the central area away from the anvil portion.

4. The method of claim 3, wherein, the positive pressure is applied by the central pressure zone while the vacuum is maintained by the pair of side pressure zones.

5. The method of claim 1, wherein the plurality of pressure zones are adjusted independently as the glass ribbon engages the anvil portion.

6. The method of claim 5, wherein the plurality of pressure zones are adjusted sequentially as the glass ribbon engages the anvil portion.

7. The method of claim 1, further comprising using a pressing device to flatten out the lateral portion of the glass ribbon against the anvil portion to achieve the substantially planar engaged profile shape, wherein the vacuum thereafter prevents the glass ribbon from returning to the substantially curved set profile shape before breaking away the glass sheet from the glass ribbon.

8. The method of claim 1, wherein the step of forming the score line is initiated before the entire lateral portion of the glass ribbon engages the anvil portion.

9. The method of claim 1, wherein the anvil portion comprises a resilient material.

10. The method of claim 1, wherein the anvil portion includes at least one pressure port in communication with a fluid pressure device to create the vacuum.

11. The method of claim 10, wherein the at least one pressure port is positioned at a higher elevation with respect to the score line.

12. The method of claim 10, wherein the at least one pressure port is provided with a plurality of apertures that control fluid flow through the pressure port.

13. The method of claim 10, wherein the at least one pressure port is provided with a plurality of apertures that filter glass particles from flowing through the pressure port.

14. The method of claim 1, wherein the anvil includes at least one pressure port in communication with a fluid pressure device to create the vacuum and an engagement surface that engages the glass ribbon when the entire lateral portion of the glass sheet is forced against the anvil portion by the vacuum, wherein the at least one pressure port is recessed within the engagement surface.

15. The method of claim 14, wherein a resilient material provides the engagement surface.

16. The method of claim 1, wherein the vacuum holds the lateral portion of the glass ribbon along a substantially straight cross-sectional profile against the anvil portion prior to breaking away the glass sheet from the glass ribbon along the score line.

17. The method of claim 1, wherein the breaking device comprises a traveling anvil machine wherein the anvil portion moves together with the lateral portion in the draw direction while maintaining the vacuum.

* * * * *